United States Patent
Dalia et al.

(10) Patent No.: US 7,337,448 B1
(45) Date of Patent: Feb. 26, 2008

(54) ADDRESS BOOK CLEARINGHOUSE INTERFACE SYSTEM AND METHOD

(75) Inventors: Apurva F. Dalia, Kirkland, WA (US); Craig Allen Harry, WakeForest, NC (US); Michael A. Pacholec, Sammamish, WA (US); Robert Thompson Whitney, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 10/606,991

(22) Filed: Jun. 25, 2003

(51) Int. Cl.
G06F 3/00 (2006.01)
G06F 7/00 (2006.01)
G06F 15/16 (2006.01)
G06F 17/00 (2006.01)
G06F 17/30 (2006.01)

(52) U.S. Cl. .................. 719/328; 707/1; 709/201; 726/1; 726/26

(58) Field of Classification Search .............. 707/1–10; 715/733, 737–743; 719/328; 709/201–207, 709/217–219; 726/1–21, 26–31
See application file for complete search history.

(56) References Cited

U.S. PATENT DOCUMENTS

| | | | |
|---|---|---|---|
| 5,835,089 A * | 11/1998 | Skarbo et al. | 715/751 |
| 5,961,620 A * | 10/1999 | Trent et al. | 710/105 |
| 6,370,566 B2 * | 4/2002 | Discolo et al. | 709/206 |
| 7,092,945 B2 * | 8/2006 | Hall et al. | 707/10 |
| 7,124,185 B2 * | 10/2006 | Kuroyanagi | 709/225 |
| 7,236,970 B1 * | 6/2007 | Winslow | 707/3 |
| 2002/0194295 A1 * | 12/2002 | Mercure et al. | 709/217 |
| 2003/0041065 A1 | 2/2003 | Lucovsky et al. | |
| 2003/0069874 A1 * | 4/2003 | Hertzog et al. | 707/1 |
| 2003/0212753 A1 * | 11/2003 | Lai | 709/217 |

OTHER PUBLICATIONS

Blum, D.J., "LDAP: Helping Directories Get Along," *Business Communications Review* 26(12):37-40, Dec. 1996, and INSPEC Abstract No. B9703-6150N-034, C9703-5640-033 [online Abstract only] CODEN: BCORBD, ISSN: 0162-3885, [retrieved Apr. 18, 2003], retrieved from www.dialogweb.com, p.1.

(Continued)

*Primary Examiner*—William Thomson
*Assistant Examiner*—Charles E Anya
(74) *Attorney, Agent, or Firm*—Christensen O'Connor Johnson Kindness PLLC

(57) ABSTRACT

The present invention provides an application programming interface ("API") to address book management functions for accessing and managing an integrated online address book clearinghouse. The API receives function calls from applications and executes one or more functions in response to the function calls. The address book functions manage address books of the integrated online address book clearinghouse by adding, deleting, updating, and finding address books, contacts, and groups of contacts of the address books. The API also verifies identity information to assure that each function call has authorization to access the desired address book. The API further includes a parameter processing module for processing function-specific parameters passed in data envelopes to the API by the applications. The API also includes a response generating module for responding to the application that sent a function call to the API.

40 Claims, 7 Drawing Sheets

OTHER PUBLICATIONS

Greetham, G., and S. Sahni, "The Makings of a Shared Address Book: NHS Electronic Directory Services", *British Journal of Healthcare Computing & Information Management* 15(6):39-41, Jul. 1998, and INSPEC Abstract [online Abstract only] CODEN: BHCMEA, ISSN: 0265-5217 [retrieved Apr. 18, 2003], retrieved from www.dialogweb.com, p. 1.

Siegel, S.A., "Network-supported applications," *Bell Labs Technical Journal* 6(2):30-46, 2001, and INSPEC Abstract [online Abstract only] CODEN: BLTJFD, ISSN: 1089-7089, [retrieved Apr. 18, 2003], retrieved from www.dialogweb.com, p. 1.

"VSLive! Speaker Interview—John Rauschenberger on Hailstorm," [online] *VSLive! 2001*, Visual Studio Developer Conference, Orlando, Oct. 9-14, 2001, <http://www.ftpconferences.com/vslive/2001/or/interview_rauschenberger.asp> [retrieved Apr. 18, 2003], pp. 1-3.

* cited by examiner

ADDRESS BOOK CLEARINGHOUSE INTERFACE SYSTEM AND METHOD

FIELD OF THE INVENTION

The present invention relates in general to computerized address books and in particular to a system and method for providing access to an integrated address book clearinghouse.

BACKGROUND OF THE INVENTION

Computerized address books and personal information managers are well known in the computing field. Software applications such as email programs, instant messaging programs and computer fax programs include or have access to computerized address books of one form or another. Such conventional address book utilizing applications generally store address book information locally on a computing device. Often the address books are in incompatible formats, requiring that the information contained in each application's address book be individually keyed in. Even where some of the format fields are common, common information must often be entered multiple times, once for each address book. Some applications have integrated address book in a way that allows a personal information manager, that can send email, stores physical address information along with email addresses. Other address book integration examples include email program address books that include instant messenger handles or fax program address books that include physical addresses and voice phone numbers.

While integrated address books included in or accessible by applications running on client computers have solved some of the previous problems of having to enter identical or similar information multiple times (once for each different type of program), such address books are ineffective when applications are located on remote computers connected to client computers or devices via a network. More specifically, networks are also well known in the computing field. By definition, a network is a group of computers and associated devices that are connected by communication facilities or links. An internetwork, in turn, is the joining of multiple computer networks, both similar and dissimilar, by means of gateways or routers that facilitate data transfer and conversion from the multiple computer networks. A well known abbreviation for the term internetwork is "internet." As currently understood, the capitalized term "Internet" refers to the collection of networks and routers that use the Internet protocol to communicate with one another. The Internet has recently seen increased growth by virtue of its ability to link computers based throughout the world. As will be better appreciated from the following description, the present invention could find use in many network environments. However, for purposes of discussion, the Internet is used as an exemplary network environment for implementing the present invention.

The Internet has quickly become a popular method of disseminating information due, in large part, to its ability to deliver information quickly and reliably. To retrieve online resources or other data over the network, a user typically uses communications or network browsing software. A common way of retrieving online resources is to use such communications or network browsing software to access online resources at a uniform resource identifier ("URI") address such as a uniform resource locator ("URL") address that indicates the location of the online resources on a server connected to the network or internetwork.

As the Internet (and other networks) have developed some of the address book utilizing applications that were formerly performed on client devices are now provided by online resources accessed via the network. One example is a Web-based email network application. As a result, the storage of address book information was shifted from client devices to online accessible devices. Online address book information storage eliminates the need for a user to export address book information when the user changes to a new device and/or adds a new device to the user's inventory of devices.

Prior attempts have been made to integrate separate address book information associated with network applications. One example is an integrated online contact list that compares all addresses in an online contact list to the addresses in an online buddy list to determine which contacts in the contact list should have an indicator showing that the contact has its instant messaging capabilities enabled (contacts with instant messaging capabilities are commonly referred to as "buddies"). This system is inefficient and stores unnecessarily redundant information. More specifically, this system retains two separate lists, an online contact list and an online buddy list, each of which can be separately updated. If inconsistent information is added to either list, their comparisons and pairings break down. For example, if the email address of a contact in the address book of a Web based email application was different than the email address of a buddy in the address book of a Web based instant messenger application, the pairing between the two is broken unless some other type of link is used to maintain the pairing.

Even though such prior attempts allowed for secure access to a user's network-based application's address book information, the information was not available to an authenticated user in an integrated fashion.

Accordingly, there is a need for an address book information clearinghouse, and an interface thereto, that provides secure access and management of address book information for particular users to multiple client device applications and/or network-based applications. It is desirable that any address book clearinghouse interface accept and provide information in an application independent manner.

SUMMARY OF THE INVENTION

The present invention is directed to a programming interface, system, and computer-readable medium for accessing and managing an integrated online address book clearinghouse. One aspect of the present invention provides a programming interface layer with address book management functions for accessing and managing an integrated online address book clearinghouse. The programming interface layer receives application programming interface ("API" or programming interface) calls from applications desiring access and management of address books included in the integrated address book clearinghouse. The programming interface layer executes one or more functions in response to received programming interface calls. The address book functions manage address books by adding, deleting, updating, and finding address books, contacts, and groups of contacts in the integrated address book clearinghouse. Additionally, the functions can manage communications permissions for address books that have communications limitations (e.g., address books for applications with parental control limits or employer-imposed limits). The programming interface layer also uses identity information and any associated identity authentication information to assure that each API call is directed to a desired address book when an address book function is executed. The programming interface layer further includes a parameter processing module for processing function-specific parameters passed in data envelopes to the programming interface layer by the applications. The programming interface layer also includes, in this aspect, a response generating module to generate a function-specific response from an address book function that is encapsulated in a data envelope and sent back to the application that sent an API call to the programming interface layer.

In some aspects of the present invention, the authentication information associated with identity information is explicitly included as a parameter passed in a data envelope to the programming interface layer.

As can be seen from the summary above, the present invention provides a programming interface for accessing and managing an online integrated address book clearinghouse system and a related computer-readable medium and system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The detailed description which follows is represented largely in terms of processes and symbolic representations of operations by conventional computing components including processors, memory storage devices for the processors, connected display devices, and input devices, all of which are well known in the art. These processes and operations may utilize conventional computing components in a heterogeneous distributed computing environment, including remote storage servers, computer servers, and memory storage devices; such processes, devices, and operations also being known to those skilled in the art and others. Each of these conventional distributed computing components is accessible by the processors via a communications network.

The present invention is directed to providing a programming interface for managing network accessible address books embodied in an integrated online address book clearinghouse. The programming interface layer in one exemplary embodiment of the present invention is an application programming interface ("API") with specific address book clearinghouse functions for managing a multitude of network accessible address books shared across multiple devices and applications. One exemplary embodiment of such an API is described in the attached appendix. However, those of ordinary skill in the art and others will appreciate that the attached API description is merely one example of a programming interface suitable for accessing an integrated online address book clearinghouse system and that, within the scope and spirit of the present invention, other APIs are possible.

Figure 1:
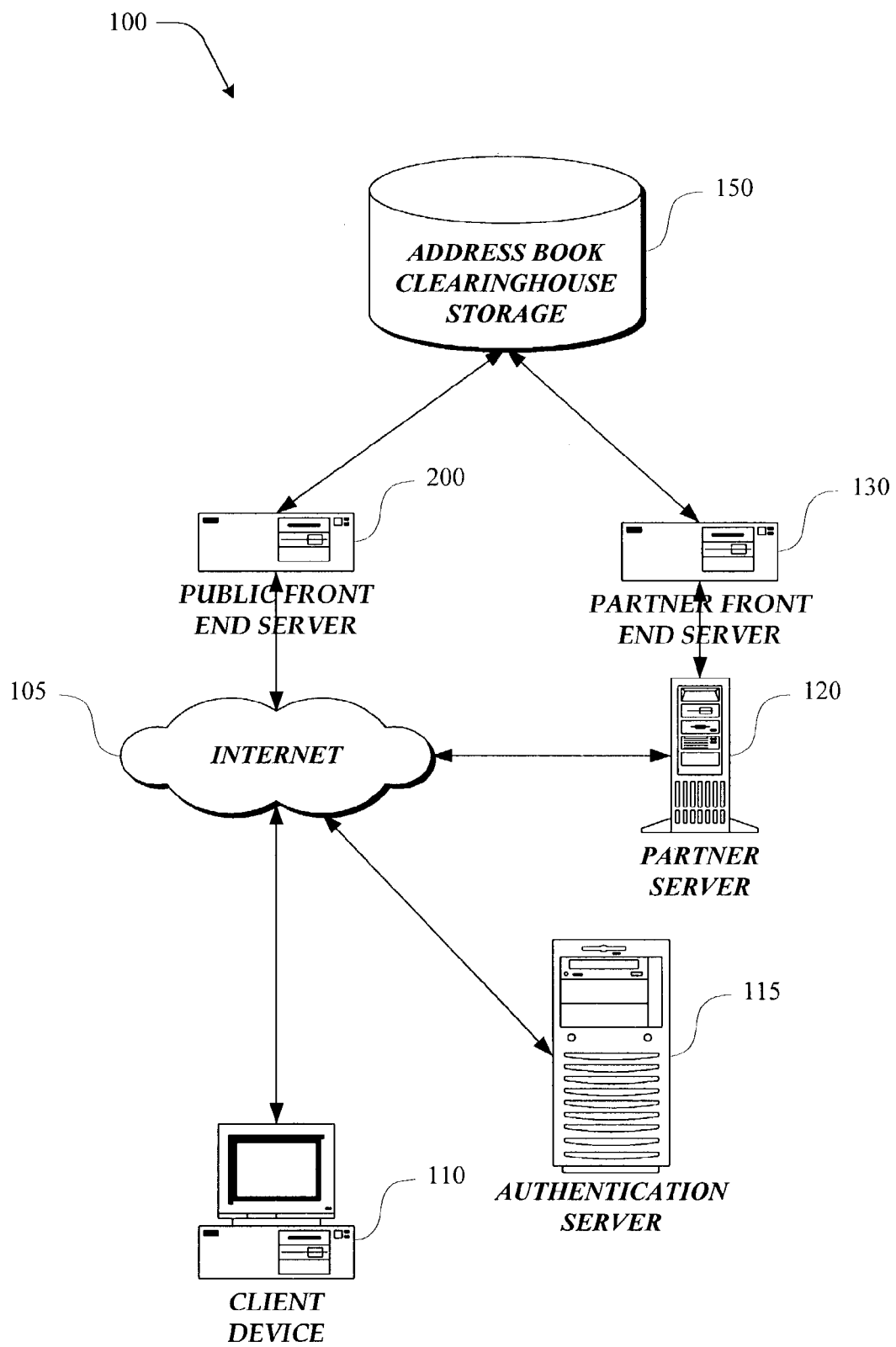
FIG. 1 is a pictorial diagram of an exemplary, simplified, integrated online address book clearinghouse.

FIG. 1 is a pictorial diagram of an exemplary, simplified integrated online address book clearinghouse 100 for providing address book information (address books, contacts, contact groups, etc.) associated with particular users to client devices via the Internet 105. For ease of illustration, a single client device 110 shown pictorially as a personal computer is included in FIG. 1, it being recognized that in actual implementations of the multiple client devices in a variety of forms, including cellular telephones and personal digital assistants (PDAs), would be included. That is, the integrated address book clearinghouse 100 functions in a distributed computing environment that includes a plurality of computing devices interconnected by the Internet 105 (or some other suitable network). In addition to the client device 110, the plurality of computing devices shown in FIG. 1 include an authentication server 115 and a partner server 120. The address books clearinghouse includes a partner front end server 130, a public front end server 200, and an address book clearinghouse storage 150. The client device 110 has computing capabilities and may be any form of device capable of communicating with the other devices of the present invention. As noted above, while the client device 110 is pictorially shown as a personal computer, this depiction should be taken as illustrative and not limiting. As will be appreciated by those of ordinary skill in the art, the authentication server 115, partner server 120, partner front end server 130, public front end server 200 and address book clearinghouse storage 150 may reside on any device accessible, directly or indirectly, by the client device 110, shown in FIG. 1 via the Internet 105. An exemplary public front end server 200 is shown in further detail in FIG. 2 and described below.

While only a single client device 110, authentication server 115, partner server 120, partner front end server 130, public front end server 200, and address book clearinghouse storage 150 have been shown in FIG. 1, it will be appreciated that many more client devices 110, authentication servers 115, partner servers 120, partner front end servers 130, public front end servers 200, and address book clearinghouse storages 150 can be included in an actual system practicing the present invention. The devices of the address book clearinghouse, namely, the public front end server 200, partner front end server 130, and address book clearinghouse 150 provide access to integrated address book information stored in the address book clearinghouse storage 150. Additionally, while both a public front end server 200 and partner front end server 130 are shown in FIG. 1, it will be appreciated that in alternate embodiments of the present invention, only a public front end server 200 or only a partner front end server 130 may be used without departing from the spirit and scope of the present invention.

Figure 2:
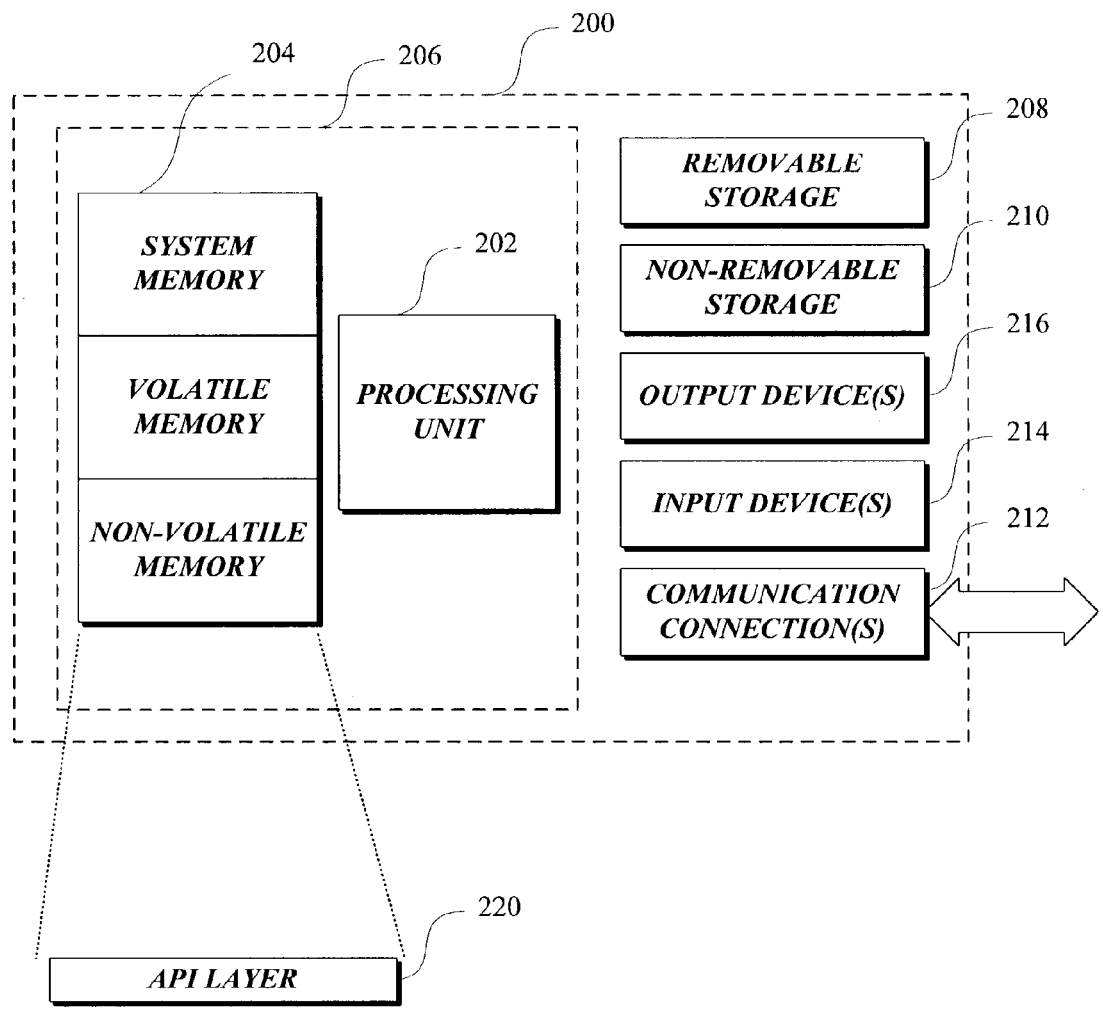
FIG. 2 is a block diagram of a public front end server suitable for use in FIG. 1.

FIG. 2 illustrates an exemplary public front end server 200 suitable for use in the address book clearing house 100 shown in FIG. 1. In its most basic form, the public front end server 200 typically includes at least one processing unit 202 and memory 204. Depending on the exact configuration and type of public front end server 200, memory 204 may be volatile (such as RAM), nonvolatile (such as ROM, flash memory, etc.), or some combination of the two. This most basic configuration is illustrated in FIG. 2 by dashed line 206. The public front end server 200 may also have additional features and/or functionality. For example, the public front end server 200 may also include additional storage (removable and/or nonremovable) including, but not limited to, magnetic or optical discs or tape. Such additional storage is illustrated in FIG. 2 by removable storage 208 and nonremovable storage 210. In general, computer storage media includes volatile and nonvolatile, removable and nonremovable media implemented in any method or technology for storage of computing information (e.g., computer-readable instructions, data structures, program modules, other data, etc.). Memory 204, removable storage 208, and nonremovable storage 210, are all examples of computer storage media. Computer storage media includes, but is not limited to, RAM, ROM, EEPROM, flash memory, or other memory technology, CD, DVD, or other optical storage, magnetic cassettes, magnetic tape, magnetic disc storage, or other magnetic storage devices, or any other medium which can be used to store or read desired information and which can be accessed by the public front end server 200. Any such computer storage media may be part of the public front end server 200. The memory 204 of a public front end server 200 practicing the present invention stores an programming interface (API) layer 220 that includes routines for accessing storage resources.

The public front end server 200 also contains a communications connection 212 that allows the device to communicate with other devices. The communications connection 212 is used to communicate computer-readable instructions, data structures, program modules or other data using a modulated data signal that includes a carrier wave or other transport mechanism modulated by the data to be communicated. By way of example and not limitation, communication connection 212 includes wired connections, both copper and optical, and wireless connections such as acoustic, radio frequency, infrared, etc. Public front end server 200 may also have input device(s) 214 such as a keyboard, a mouse, a pen, a voice input device, a touch input device, etc. Output device(s) 216 such as a display, speakers, a printer, etc., may also be included. Since all these devices are well known in the art, they are not described here.

Since, in general, the partner front end server 130 can be similar to the public front end server 200 described above, the partner front end server 130 is not described in detail. Similarly, the authentication server 115 and the partner server 120, except for the API Layer 222, can also be similar to the public front end server 200 described above, and these servers are also not described in detail.

Figure 3:
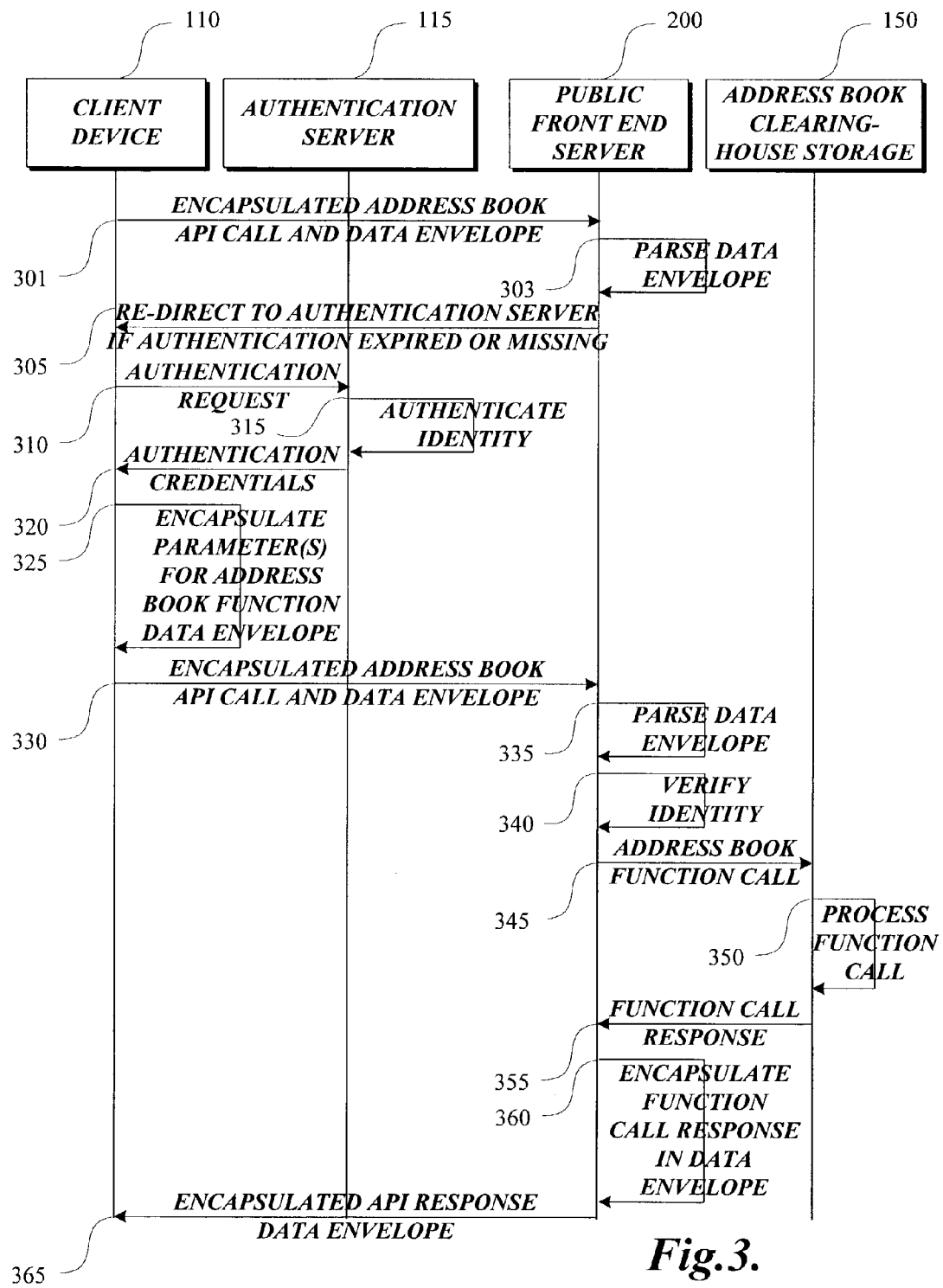
FIG. 3 is a diagram illustrating the actions of a client device, authentication server, public front end server, and an address book clearinghouse storage when accessing the online address book clearinghouse shown in FIG. 1.

The operation of an integrated address book clearinghouse 100 according to the present invention will be better understood by reference to FIG. 3, which illustrates one exemplary sequence of communication interactions between the client device and selected ones of the servers shown in FIG. 1, and the address book clearinghouse storage 150. The selected servers are the authentication server 115, and the public front end server 200. The exemplary communications interactions shown in FIG. 3 begin by the client device 110 sending 301 an encapsulated address book API call and data envelope to the public front end server 200. Next, the public front end server 200 parses 303 the data envelope to retrieve the API call and any function parameters. In the exemplary communications interactions shown in FIG. 3, the public front end server 200 redirects 305 the client device 110 to the authentication server 115 if the authentication data in the envelope is expired or missing. If this occurs, the client device 110 submits 310 an authentication request to the authentication server 115. Those of ordinary skill in the art and others will appreciate that authentication servers 115 may take many forms. In one exemplary embodiment of the present invention the authentication server 115 is provided by a network authentication service such as Microsoft's NET Passport service. Other authentication servers 115 able to verify a user's identity using conventional authentication techniques may be used as well.

The authentication server 115 authenticates 315 the identity included in the authentication request 310. After the authentication server has authenticated 315 the identity, authentication credentials are sent 320 back to the client device 110. The authentication credentials may take any form that can be provided by the client device 110 to other devices to indicate that client device 110 is being operated by a user who is allowed to access the address book clearinghouse server 150 via the public front end server 200. One exemplary form of authentication credentials is authentication "cookies." An authentication cookie is cryptographically signed and encrypted data provided to a client device 110 by an authentication server 115 to persist an identity's authentication at the client device 100. Other exemplary forms of authentication credentials include kerberos tokens and transient cryptographically signed and authenticated access information.

Next, the client device 110 encapsulates 325 parameters in an address book function data envelope that includes the authentication credentials and other address book function specific parameters. This further (second) encapsulated address book API call and data envelope is then sent 330 to the public front end server 200. The public front end server 200 parses 335 the envelope. Next, the public front end server 200 verifies 340 the encapsulated authentication credentials included in the data envelope. Once the identity of the user is thusly verified, the public front end server sends 345 an clearinghouse function call to the address book clearinghouse storage 150 that corresponds to the address book function specified in the API call. The address book clearinghouse storage 150 processes 350 the clearinghouse function call and returns 355 the function call response to the public front end server 200. The public front end server 200 then encapsulates 360 the function call response in a response data envelope that identifies the API call it is responding to and the identified address book of that call and returns 365 the encapsulated API response data envelope to the client device 110.

Those of ordinary skill in the art and others will appreciate that the communications interactions illustrated in FIG. 3 provide structured and efficient access to an online address book clearinghouse. If necessary, the request for access can be authenticated prior to allowing access to the address book clearinghouse storage 150. Those of ordinary skill in the art and others will appreciate that FIG. 3 represents only one exemplary set of communication interactions. Others are possible. For example, authenticating an identity by the authentication server 115 may grant the authenticated user permission to send other identities to the public front end server 200, e.g., may grant a parent permission to access address books belonging to a child associated with the parent (and their identity). Address books with parental controlled access and other forms of associated access (such as employer controlled access) are allow one user to control the accesses and communication of another user. Exemplary "ABAllowListSet" (for setting those emails and instant messenger contacts that a particular subsidiary user has access to) and "ABAllowListGet" (for setting the emails and instant messenger contacts that a particular subsidiary user is allowed to receive from) functions are described in greater detail in the Appendix portion of this detailed description.

The communication interactions illustrated in FIG. 3 between various external devices and devices of the integrated address book clearinghouse 100 may employ any conventional computing communication form. In one exemplary embodiment of the present invention, the communications are formatted using the Simple Open Access Protocol ("SOAP") with extensible markup language ("XML") formatted instructions and/or parameters. An exemplary XML formatted instruction for an address book creation request (ABAdd) is illustrated by the following code:

TABLE

```
POST /abservice/abservice.asmx HTTP/1.1
Host: contacts.msn.com
Content-Type: text/xml; charset=utf-8
Content-Length: length
SOAPAction: "http://www.msn.com/webservices/AddressBook/ABAdd"
<?xml version="1.0" encoding="utf-8"?>
<soap:Envelope xmlns:xsi=
"http://www.w3.org/2001/XMLSchema-instance"
xmlns:xsd="http://www.w3.org/2001/XMLSchema"
xmlns:soap="http://schemas.xmlsoap.org/soap/envelope/">
   <soap:Header>
      <ABApplicationHeader xmlns=
      "http://www.msn.com/webservices/AddressBook">
         <ApplicationId>
         0000000000000000000010010efd4e487</ApplicationId>
         <IsMigration>0</IsMigration>
      </ABApplicationHeader>
      <ABAuthHeader xmlns=
      "http://www.msn.com/webservices/AddressBook">
         <ManagedGroupRequest>0</ManagedGroupRequest>
      </ABAuthHeader>
   </soap:Header>
   <soap:Body>
      <ABAdd xmlns="http://www.msn.com/webservices/AddressBook">
         <abInfo>
            <name></name>
            <ownerEmail>ken@hotmail.com</ownerEmail>
            <fDefault>1</fDefault>
            <isMessengerMigrated>0</isMessengerMigrated>
         </abInfo>
      </ABAdd>
   </soap:Body>
</soap:Envelope>
```

Those of ordinary skill in the art and others will appreciate that the address book creation request (ABAdd) illustrated above is merely one form of instructions between the FIG. 3 devices and that many other forms of communications may be possible. The attached appendix includes other forms of data envelopes and methods that may be used to communicate between the FIG. 3 devices.

Figure 4:
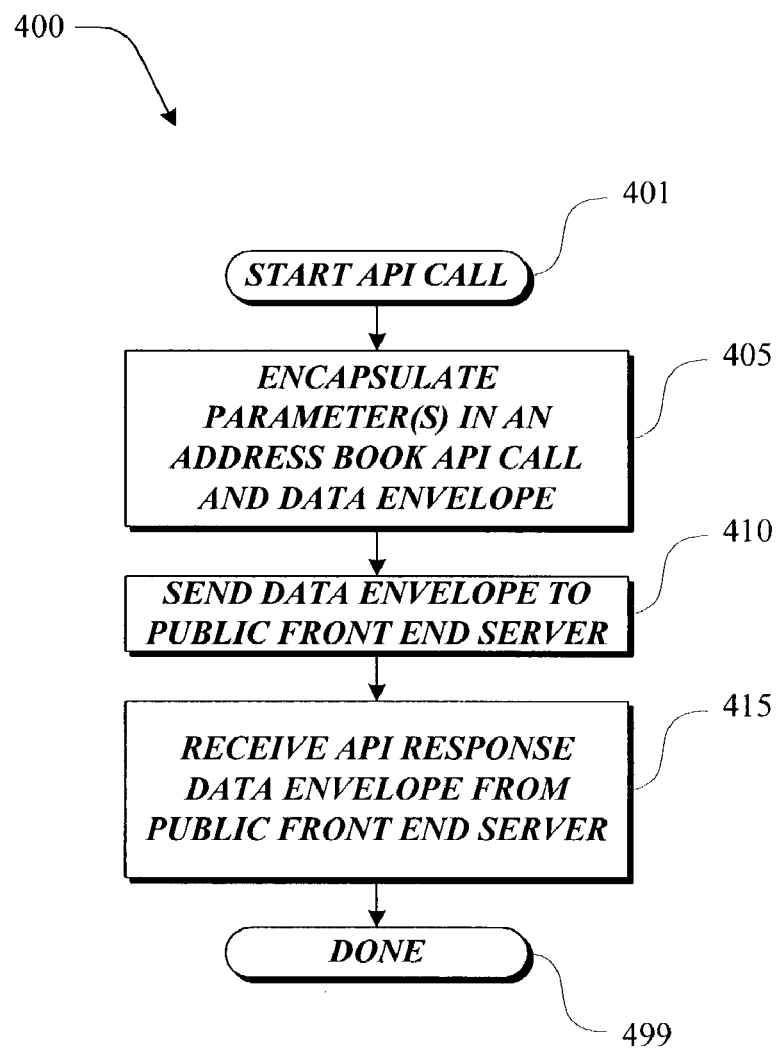
FIG. 4 is a flow diagram illustrating an address book clearinghouse API calling routine according to the present invention.

FIG. 4 is a flow chart illustrating an address book clearinghouse API call routine 400 implemented by the client device 110 for carrying out the communication interactions shown in FIG. 3. The API calling routine 400 begins at block 401 and proceeds to block 405 where parameters for an address book function are encapsulated in an address book API call and data envelope by the calling client device. The data envelope is then sent in block 410 to the public front end server 200. Next, in block 415 an address book function-specific response is received back from the public front end server 200 to the encapsulated address book API call and data envelope sent in block 405. The address book clearinghouse API calling routine 400 then ends at block 499.

Figure 5:
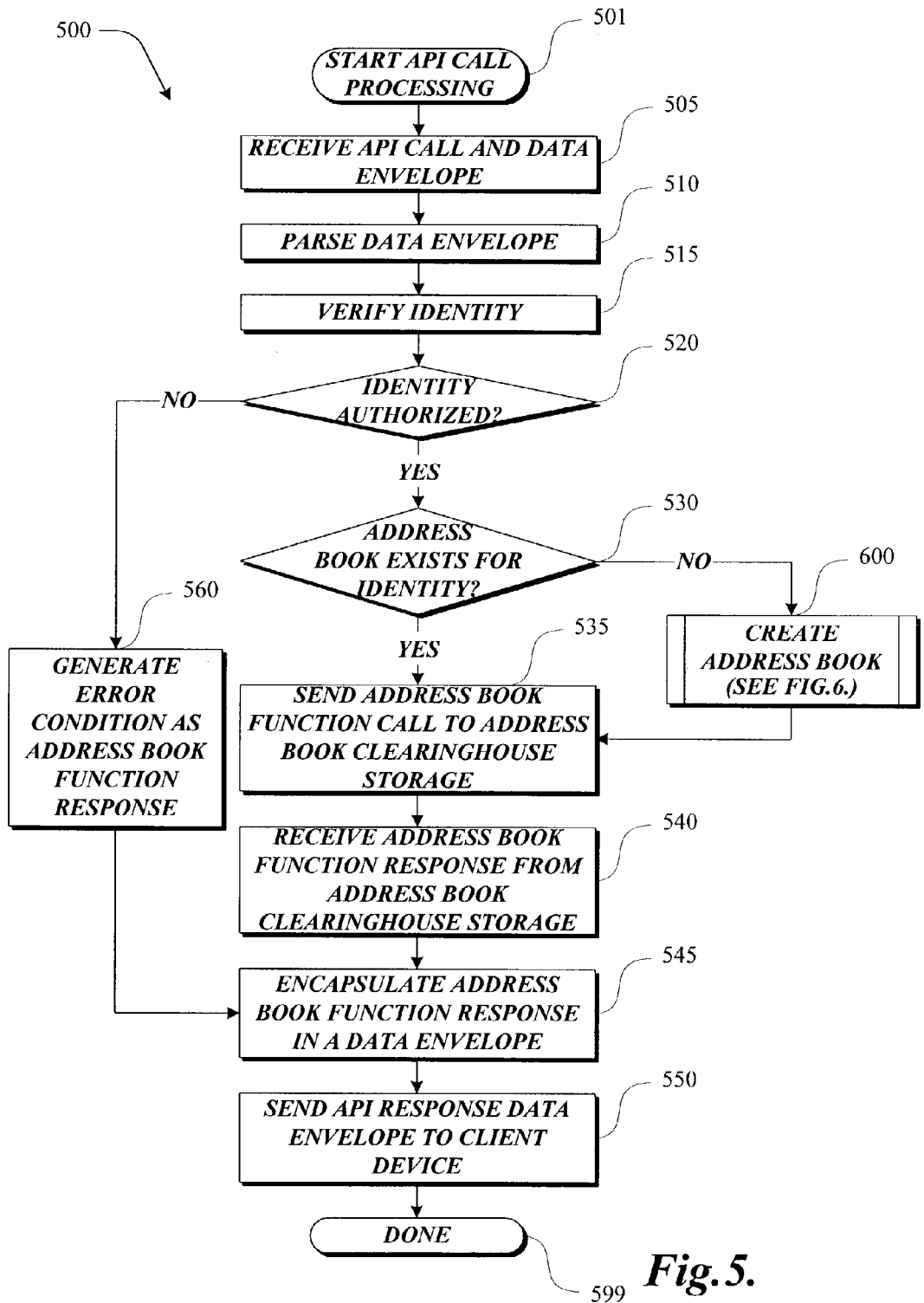
FIG. 5 is a flow diagram illustrating an address book clearinghouse API call processing routine according to the present invention.

After the public front end server 200 receives the address book API call and data envelope sent by the client device as shown in FIG. 3, the public front end server 200 processes the API call. FIG. 5 illustrates an API call processing routine 500. The API call processing routine 500 begins at block 501 and proceeds to block 505 where both the address book API call and data envelope is received from the client device 110. Next, the data envelope is parsed in block 510 to extract the API call parameters, including the authentication data associated with an address book function being accessed by the API call. The parsing of the data envelope (e.g. by executing an parameter processing module) also identifies which address book function is being called by the API. In block 515, the authentication information in the data envelope is verified (e.g. by executing an identity authentication module). In decision block 520 a determination is made whether the identity identified by the authentication information is authorized to access the called address book function. If the identity is not authorized, processing proceeds to block 560 where an error condition is generated as an address book function response. Processing then continues to block 545 where the address book function response is encapsulated in a data envelope (e.g. by executing an response generating module). In block 550, the data envelope is sent to the client device, after which API call processing routine 500 ends at block 599.

As will be readily understood by those skilled in the art and others, the path through blocks 560, 545 and 550 may cause the client device to seek authorization credentials for an authorization server 115 as shown in FIG. 3 and described above.

Figure 6:
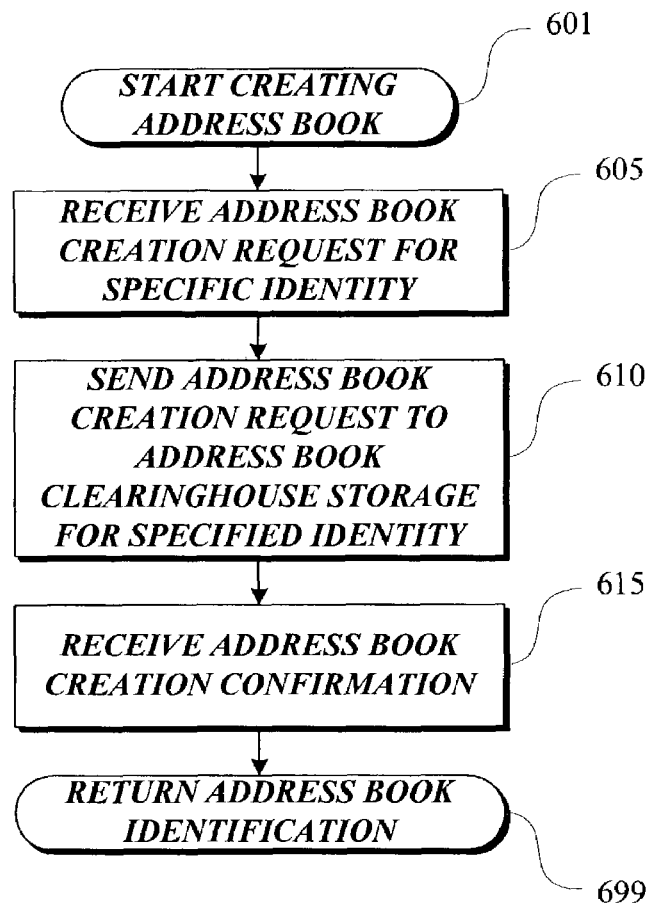
FIG. 6 is a flow diagram illustrating an address book creation subroutine suitable for use in the address book clearinghouse call processing routine illustrated in FIG. 5.

If in decision block 520 a determination was made that the identity is authorized, then processing proceeds to decision block 530 where a determination is made whether an address book exists for the identity. If no address book is found to exist in decision block 530, processing proceeds to subroutine block 600 where an address book is created for the identity. An address book creating subroutine 600 is illustrated in FIG. 6 and described below. After an address book has been created, and the address book creating subroutine 600 has returned, processing proceeds to block 535. If an address book was found to exist in decision block 530, processing proceeds directly to block 535. At block 535 the clearinghouse function call specified in the received data envelope is sent to the address book clearinghouse storage 150. In block 540, the address book function response is received from the address book clearinghouse storage. Processing then proceeds to block 545 where the address book function response is encapsulated in a data envelope as discussed above. Then, in block 550 the API response data envelope is sent to the client device.

Those of ordinary skill in the art and others will appreciate that there are many possible API function calls that may be made to an address book clearinghouse. The appendix to this detailed description, includes a number of exemplary address book clearinghouse API function calls. The exemplary API function calls include: ABAdd (for adding a new address book); ABDelete (for deleting an existing address book); ABUpdate (for updating an address book); ABFind (for locating an address book); ABContactAdd (for adding a new contact); ABContactDelete (for deleting an existing contact); ABContactUpdate (for updating a contact); ABContactFind (for finding Contacts), ABFindAll (for gathering all address book, contact and group information); ABFindByContacts (for finding all contacts and any groups containing listed contacts); ABFindByGroups (for locating all contacts in given groups and the groups themselves); ABFindMessengerUsers (for locating contacts with instant messaging capability); ABFindMeContact (for locating the contact for the address book owner); ABGroupAdd (for adding a new group); ABGroupDelete (for deleting an existing group); ABGroupUpdate (for updating a group); ABGroupFind (for locating a group); ABGroupContactAdd (for adding a contact to a group); ABGroupContactDelete (for removing a contact from a group); ABAllowListSet (for setting those emails and instant messenger contacts that a particular subsidiary user has access to); ABAllowListGet (for setting the emails and instant messenger contacts that a particular subsidiary user is allowed to receive from). Those of ordinary skill in the art and others will appreciate that both more and less API function calls may be employed in an address book clearinghouse system, without departing from the spirit and scope of the present invention.

FIG. 6 illustrates an exemplary address book creating subroutine 600 for creating an identity coupled address book in accordance with the present invention. The address book creating subroutine 600 begins at block 601 and proceeds to block 605 where an address book creation request is received for a specific user identity. In block 610, the address book creation request is sent to the address book clearinghouse storage 150 indicating that an address book should be created for the specified identity. In block 615, an address book creation confirmation is received back from the address book clearinghouse storage. Address book creating subroutine 600 then ends at block 699, returning the address book identification to its calling routine.

Those of ordinary skill in the art and others will appreciate that address book creating subroutines may include other elements and steps other than those listed above and illustrated in FIG. 6. The "ABAdd" API call listed in the appendix provides exemplary parameters that may be used when creating an address book in accordance with the present invention. The ABAdd API call is presented merely as one example of an address book creating function call, and those of ordinary skill in the art and others will appreciate that there are a myriad of other possible address book creating function calls all of which fall within the spirit and scope of the present invention.

Figure 7:
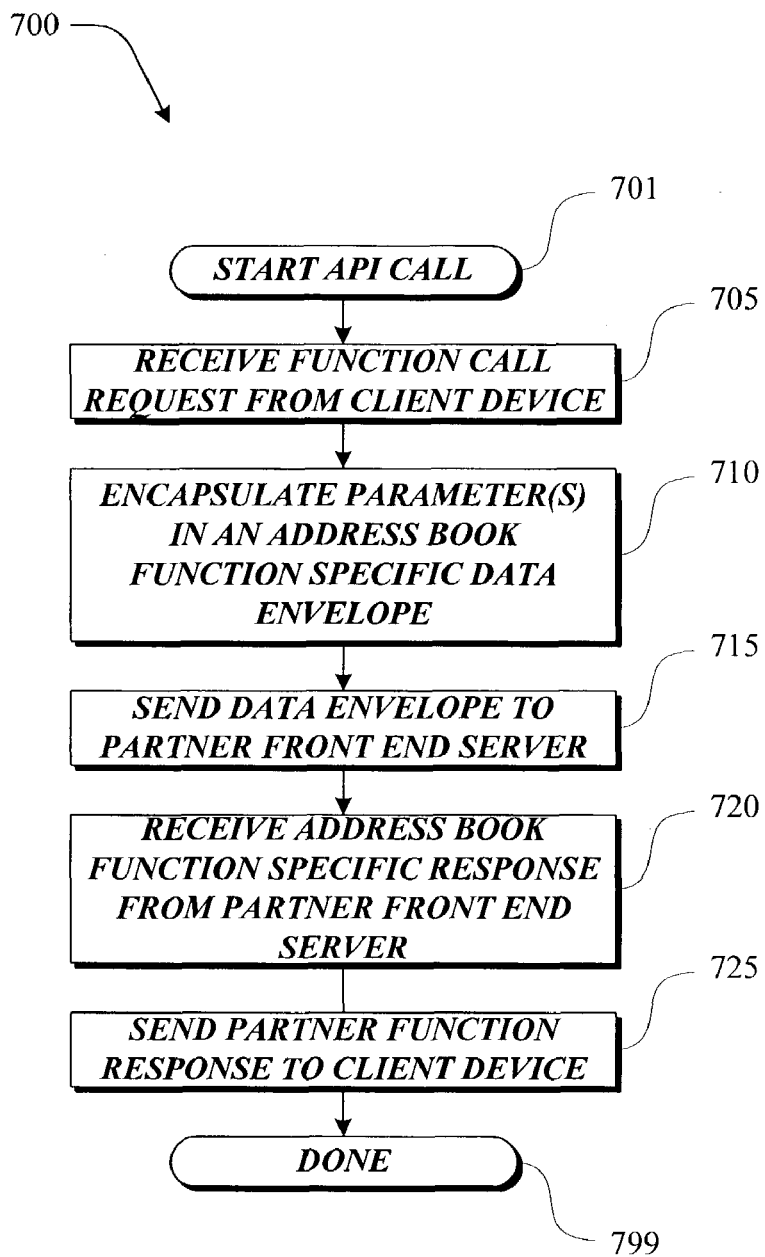
FIG. 7 is a flow diagram illustrating an alternate address book clearinghouse API calling routine according to the present invention.

FIG. 1 illustrates a partner server 120 in communication with devices of the integrated address book clearinghouse 100. A flow chart illustrating an address book clearinghouse API calling routine 800 implemented by the partner server 120, in accordance with one exemplary embodiment of the present invention, is shown in FIG. 7. The API calling routine 700 begins at block 701 and proceeds to block 705 where a function call request is received from the client device 110. Next, in block 710, parameters for an address book function are encapsulated in an address book function-specific data envelope. The data envelope is then sent in block 715 to the partner front end server 120. Next, in block 720 an address book function-specific response is received back from the partner front end server 120 that corresponds to the encapsulated address book function-specific data envelope sent in block 710. In block 725, the partner server 120 sends a partner response to the client device 110 with information from the address book function-specific response received from the partner front end server 120. Address book clearinghouse API calling routine 700 then ends at block 799.

Those of ordinary skill in the art and others will appreciate that the API calling routine of the partner server 120 illustrated in FIG. 7 is similar to the API calling routine of the client device 110 illustrated in FIG. 4. It will also be appreciated that various actions delegated to the client device 110 or the partner server 120 may be performed in whole or in part by the client device 110 or the partner server 120, when a partner server (or other intermediary devices) is interposed between the partner front end server 130 and the client device 110 when accessing the address book clearinghouse storage 150.

While the presently preferred embodiment of the invention has been illustrated and described, it will be appreciated that various changes can be made therein without departing from the spirit and scope of the invention as defined by the appended claims. claimed are defined as follows:

The embodiments of the invention in which an exclusive property or privilege is claimed are defined as follows:

1. An integrated address book clearinghouse interface stored on computer-readable storage medium, the integrated address book clearinghouse interface comprising:
  (A) a plurality of distinct and separate function modules, usable by a plurality of application programs for managing a plurality of address books that form an integrated address book clearinghouse, by performing functions on the integrated address book clearinghouse;
  (B) an encapsulation module for encapsulating in data envelopes requests for the performance of functions on the integrated address book clearinghouse and authorization to perform the requested functions, the requests including:
    (1) a request to perform an add, delete, update, or find address book function, the data envelope encapsulating the request comprising:
      (a) a header section, comprising:
        (i) an address book application header field; and
        (ii) an address book authorization header field; and
      (b) a body section, comprising:
        (i) an address book add field if the request includes an add address book function,
        (ii) an address book delete field if the request includes a delete address book function,
        (iii) an address book update field if the request includes an update address book function, and
        (iv) an address book find field if the request includes a find address book function;
    (2) a request to perform an add, delete, update, or find address book contact function, the data envelope encapsulating the request comprising:
      (a) a header section, comprising:
        (i) an address book application header field; and
        (ii) an address book authorization header field; and
      (b) a body section, comprising:
        (i) an address book contact add field if the request includes an add contact function,
        (ii) an address book contact delete field if the request includes a delete contact function, (iii) an address book contact update field if the request includes an update contact function, (iv) an address book contact find field if the request includes a find contact function, (3) a request to perform an (i) add, delete, update, and find a group or a set of groups function, (ii) add or merge contacts into groups function, or (iii) delete a contact from one or more groups function, the data envelope encapsulating the request comprising:

(a) a header section, comprising:
  (i) an address book application header field; and
  (ii) an address book authorization header field; and
(b) a body section, comprising:
  (i) an address book add group field if the request includes an add a group or a set of groups function,
  (ii) an address book delete group field if the request includes a delete a group or a set of groups function,
  (iii) an address book update group field if the request includes an update a group or a set of groups function,
  (iv) an address book find group field if the request includes a find a group or a set of groups function,
  (v) an address book contact add group field if the request includes an add or merge contacts into groups functions, and
  (vi) an address book contact delete group field if the request includes a delete a contact from one or more groups function;

(4) a request to perform a (i) find all contacts, groups, and address book information function, (ii) find a contact and groups containing the contact function, (iii) find one or more contacts in a group function, (iv) find a contact who is a Messenger® user function, or (v) find a contact who is an owner of an address book function, the data envelope encapsulating the request comprising:

(a) a header section, comprising:
  (i) an address book application header field; and
  (ii) an address book authorization header field; and
(b) a body section, comprising:
  (i) an address book find all contacts, groups, and address book information field if the request includes a find all contacts, groups, and address book information function,
  (ii) an address book find a contact by group containing the contact field if the request includes a find a contact and groups containing the contact function,
  (iii) an address book find one or more contacts in a group field if the request includes a find one or more contacts in a group function,
  (iv) an address book find a contact who is a Messenger® user field if the request includes a find the contact who is a Messenger® user function, and
  (v) an address book find a contact who is an owner of the address book field if the request includes a find the contact who is an owner of an address book function; and (5) a request to perform a get a parental control allow list in an address book function or a set the parental control allow list in the address book function, the data envelope encapsulating the request comprising:
(a) a header section, comprising:
  (i) an address book application header field; and
  (ii) an address book authorization header field; and
(b) a body section, comprising:
  (i) an address book get a parental control allow list in an address book field if the request includes a get a parental control allow list in an address book function; and
  (ii) an address book set the parental control allow list in the address book field if the request includes a set a parental control allow list in the address book function;

(C) an analyzing module for analyzing the data envelopes to detect the encapsulated requests and authorization to verify the authenticity of the encapsulated requests;

(D) an address book function call module for generating function calls to request the performance of the requested functions on the integrated address book clearinghouse if the requests are authentic;

(E) a function call processing module for parsing the function calls requesting the performance of the functions on the integrated address book clearinghouse and relaying the parsed function calls to the integrated address book clearinghouse;

(F) a function call response module for generating responses to processed function calls; and (G) a response encapsulation module for encapsulating in data envelopes responses to processed function calls and information identifying an address book of the plurality of address books on which a function call was carried out, the responses including:

(1) a response to an add, delete, update, or find an address book function, the data envelope encapsulating the response including a body section comprising:
  (a) an address book add response field if the request causing the generation of the function call includes an add address book function;
  (b) an address book delete response field if the request causing the generation of the function call includes a delete address book function;
  (c) an address book update response field if the request causing the generation of the function call includes an update address book function, and
  (d) an address book find response field if the request causing the generation of the function call includes a find address book function;

(2) a response to an add, delete, update, or find one or more contacts in an address book function, the data envelope encapsulating the response including a body section comprising:
  (a) an address book contact add response field if the request causing the generation of the function call includes an add contact function,
  (b) an address book contact delete response field if the request causing the generation of the function call includes a delete contact information function,
  (ci) an address book contact update response field if the request causing the generation of the function call includes an update contact function, and
  (d) an address book contact find response field if the request causing the generation of the function call includes a find contact function;

(3) a response to (i) an add, delete, update, and find a group or a set of groups function, (ii) an add or merge contacts into groups function, or (iii) a delete a contact from one or more groups function, the data envelope encapsulating the response including a body section comprising:
  (a) an address book group add response field if the request causing the generation of the function call includes an add a group or set of groups function,
  (b) an address book group delete response field if the request causing the generation of the function call includes a delete a group or set of groups function,
  (c) an address book group update response field if the request causing the generation of the function call includes an update a group or set of groups function,
  (d) an address book group find response field if the request causing the generation of the function call includes a find a group or set of groups function,
  (e) an address book contact add group response field if the request causing the generation of the function call includes an add or merge contacts into groups function, and
  (f) an address book contact delete group response field if the request causing the generation of the function call includes a delete a contact from one or more groups function;
(4) a response to: (i) a find all contacts, groups, and address book information function, (ii) a find a contact and groups containing the contact function, (iii) a find one or more contacts in a group function, (iv) a find a contact who is a Messenger® user function, or (v) a find a contact who is the owner of an address book function, the data envelope encapsulating the response including a body section comprising:
  (a) an address book find all contacts, groups, and address book information response field if the request causing the generation of the function call includes a find all contacts, groups, and address book information function,
  (b) an address book find a contact by group containing the contact response field if the request causing the generation of the function call includes a find the contact as well as groups containing the contact function,
  (c) an address book find one or more contacts in a group response field if the request causing the generation of the function call includes a find one or more contacts in a group function,
  (d) an address book find a contact who is a Messenger® user response field if the request causing the generation of the function call includes a find a contact who is a Messenger® user function, and
  (e) an address book find a contact who is the owner of an address book response field if the request causing the generation of the function call includes a find a contact who is the owner of an address book function; and
(5) a response to get a parental control allow list in an address book function or set a parental control allow list in the address book function, the data envelope encapsulating the response including a body section comprising
  (a) an address book get a parental control allow list in an address book response field if the request causing the generation of the function call includes a get a parental control allow list in an address book function, and
  (b) an address book set a parental control allow list in an address book response field if the request causing the generation of the function call includes a set a parental control allow list in an address book function.

2. An integrated address book clearinghouse interface as claimed in claim 1, further comprising an authorization module for seeking authority to authorize the encapsulated requests for the performance of the functions on the integrated address book clearinghouse if the encapsulated requests do not include authorization to perform the encapsulated requests.

3. An integrated address book clearinghouse interface as claimed in claim 1 wherein the header section of the data envelope encapsulating (1) the request to perform an add, delete, update, or find address book function; (2) the request to perform an add, delete, update, or find address book contact function; (3) the request to perform the (a) add, delete, update, and find a group or a set of groups function, (b) add or merge contacts into groups function, or (c) delete a contact from one or more groups function; (4) the request to perform the (a) find all contacts, groups, and address book information function, (b) find a contact and groups containing the contact function, (c) find one or more contacts in a group function, (d) find a contact who is a Messenger® user function, or (e) find a contact who is an owner of an address book function; and (5) the request to perform a get a parental control allow list in an address book function or a set the parental control allow list in the address book function, comprising:
  (A) an address book application header field comprising:
    (1) an application identification parameter; and
    (2) a first Boolean parameter; and
  (B) an address book authorization header field comprising:
    (1) a hyperlink to a Web service; and
    (2) a second Boolean parameter.

4. An integrated address book clearinghouse interface as claimed in claim 3 wherein the body section of the data envelope encapsulating the request to perform an add address book function, comprising:
  (A) a hyperlink to a Web service; and
  (B) an address book information field.

5. An integrated address book clearinghouse interface as claimed in claim 3 wherein the body section of the data envelope encapsulating the request to perform a delete address book function, comprising a hyperlink to a Web service.

6. An integrated address book clearinghouse interface as claimed in claim 3 wherein the body section of the data envelope encapsulating the request to perform a update address book function, comprising:
  (A) a hyperlink to a Web service; and
  (B) an address book field.

7. An integrated address book clearinghouse interface as claimed in claim 3 wherein the body section of the data envelope encapsulating the request to perform a find address book function, comprising:
  (A) a hyperlink to a Web service; and
  (B) an identification of an owner of the address book.

8. An integrated address book clearinghouse interface as claimed in claim 3, wherein the body section of the data envelope encapsulating the request to perform an add address book contact function, comprising:
(A) a hyperlink to a Web service; and
(B) a contacts field comprising:
(1) a contact field;
(2) a primary email field;
(3) an email field;
(4) a phones field;
(5) a locations field;
(6) a Web sites field;
(7) a properties changed field; and
(8) an annotations field.

9. An integrated address book clearinghouse interface as claimed in claim 3, wherein the body section of the data envelope encapsulating the request to perform a delete address book contact function, comprising:
(A) a hyperlink to a Web service; and
(B) a contacts field comprising a contact field.

10. An integrated address book clearinghouse interface as claimed in claim 3, wherein the body section of the data envelope encapsulating the request to perform an update address book contact function, comprising:
(A) a hyperlink to a Web service; and
(B) a contacts field comprising:
(1) a contact field;
(2) a primary email field;
(3) an email field;
(4) a phones field;
(5) a locations field;
(6) a Web sites field;
(7) a properties changed field; and
(8) an annotations field.

11. An integrated address book clearinghouse interface as claimed in claim 3 wherein the body section of the data envelope encapsulating the request to perform a find address book contact function, comprising:
(A) a hyperlink to a Web service; and
(B) a contact filter field comprising a group filter field and a contacts identification field.

12. An integrated address book clearinghouse interface as claimed in claim 3 wherein the body section of the data envelope encapsulating the request to perform the add a group or a set of groups function, comprising:
(A) a hyperlink to a Web service; and
(B) a group information field.

13. An integrated address book clearinghouse interface as claimed in claim 3 wherein the body section of the data envelope encapsulating the request to perform the delete a group or a set of groups function, comprising:
(A) a hyperlink to a Web service; and
(B) a group filter field.

14. An integrated address book clearinghouse interface as claimed in claim 3 wherein the body section of the data envelope encapsulating the request to perform the update a group or a set of groups function, comprising:
(A) a hyperlink to a Web service; and
(B) a groups field.

15. An integrated address book clearinghouse interface as claimed in claim 3 wherein the body section of the data envelope encapsulating the request to perform the find a group or a set of groups function, comprising:
(A) a hyperlink to a Web service;
(B) a group filter field; and
(C) an annotations field.

16. An integrated address book clearinghouse interface as claimed in claim 3 wherein the body section of the data envelope encapsulating the request to perform the add or merge contacts into groups function, comprising:
(A) a hyperlink to a Web service;
(B) a group filter field;
(C) a contacts field; and
(D) a group contact add options field.

17. An integrated address book clearinghouse interface as claimed in claim 3 wherein the body section of the data envelope encapsulating the request to perform the delete a contact from one or more groups function, comprising:
(A) a hyperlink to a Web service;
(B) a group filter field; and
(C) a contacts field.

18. An integrated address book clearinghouse interface as claimed in claim 3 wherein the body section of the data envelope encapsulating the request to perform the find all contacts, groups, and address book information function, comprising:
(A) a hyperlink to a Web service; and
(B) an address book view field.

19. An integrated address book clearinghouse interface as claimed in claim 3 wherein the body section of the data envelope encapsulating the request to perform the find a contact and groups containing the contact function, comprising:
(A) a hyperlink to a Web service; and
(B) a contacts identification field.

20. An integrated address book clearinghouse interface as claimed in claim 3 wherein the body section of the data envelope encapsulating the request to perform the find one or more contacts in a group function, comprising:
(A) a hyperlink to a Web service; and
(B) a group identification field.

21. An integrated address book clearinghouse interface as claimed in claim 3 wherein the body section of the data envelope encapsulating the request to perform the find a contact who is a Messenger® user function, comprising a hyperlink to a Web service.

22. An integrated address book clearinghouse interface as claimed in claim 3 wherein the body section of the data envelope encapsulating the request to perform the find a contact who is an owner of an address book function, comprising a hyperlink to a Web service.

23. An integrated address book clearinghouse interface as claimed in claim 3 wherein the body section of the data envelope encapsulating the request to perform a get a parental control allow list in an address book function or a set the parental control allow list in the address book function comprising a hyperlink to a Web service.

24. An integrated address book clearinghouse interface as claimed in claim 1 wherein the address book add response field comprising:
(A) a hyperlink to a Web service; and
(B) an address book add result parameter.

25. An integrated address book clearinghouse interface as claimed in claim 1 wherein the address book delete response field and the address book update response field comprising:
(A) a hyperlink to a Web service.

26. An integrated address book clearinghouse interface as claimed in claim 1 wherein the address book find response field comprising:
(A) a hyperlink to a Web service; and
(B) an address book find result field.

27. An integrated address book clearinghouse interface as claimed in claim 1 wherein the address book contact add response field comprising:
(A) a hyperlink to a Web service; and
(B) an address book contact add result field.

28. An integrated address book clearinghouse interface as claimed in claim 1 wherein the address book contact delete response field and the address book contact update response field comprising:
(A) a hyperlink to a Web service.

29. An integrated address book clearinghouse interface as claimed in claim 1 wherein the address book contact find response field comprising:
(A) a hyperlink to a Web service; and
(B) an address book contact find result field comprising:
    (1) a pair of group fields;
    (2) a pair of contact fields; and
    (3) an address book last change parameter.

30. An integrated address book clearinghouse interface as claimed in claim 1 wherein the address book group add response field comprising:
(A) a hyperlink to a Web service; and
(B) an address book group add result field.

31. An integrated address book clearinghouse interface as claimed in claim 1 wherein the address book group delete response field, the address book group update response field, and the address book contact delete group response field comprising:
(A) a hyperlink to a Web service.

32. An integrated address book clearinghouse interface as claimed in claim 1 wherein the address book group find response field comprising:
(A) a hyperlink to a Web service; and
(B) an address book group find results field comprising:
    (1) a pair of group fields.

33. An integrated address book clearinghouse interface as claimed in claim 1 wherein the address book contact add group response field comprising:
(A) a hyperlink to a Web service; and
(B) an address book group contact add result field.

34. An integrated address book clearinghouse interface as claimed in claim 1 wherein the address book find all contacts, groups, and address book information response field comprising:
(A) a hyperlink to a Web service; and
(B) an address book find all response field comprising:
    (1) an address book find all result field comprising:
        (a) an address book field;
        (b) a contacts field; and
        (c) a groups field.

35. An integrated address book clearinghouse interface as claimed in claim 1 wherein the address book find a contact by group containing the contact response field comprising:
(A) a hyperlink to a Web service; and
(B) an address book find by contacts result field comprising:
    (1) an address book field;
    (2) a contacts field; and
    (3) a groups field.

36. An integrated address book clearinghouse interface as claimed in claim 1 wherein the address book find one or more contacts in a group response field comprising:
(A) a hyperlink to a Web service; and
(B) an address book find by group result field comprising:
    (1) an address book field;
    (2) a contacts field; and
    (3) a group field.

37. An integrated address book clearinghouse interface as claimed in claim 1 wherein the address book find a contact who is a Messenger® user response field comprising:
(A) a hyperlink to a Web service; and
(B) an address book find Messenger user result field comprising:
    (1i) an address book field;
    (2) a contacts field; and
    (3) a group field.

38. An integrated address book clearinghouse interface as claimed in claim 1 wherein the address book find a contact who is the owner of an address book response field comprising:
(A) a hyperlink to a Web service; and
(B) an address book find me contact result field comprising:
    (1) an address book field;
    (2) a contacts field; and
    (3) a group field.

39. An integrated address book clearinghouse interface as claimed in claim 1 wherein the address book get a parental control allow list in an address book response field comprising:
(A) a hyperlink to a Web service; and
(B) an address book find me contact result field comprising:
    (1) an address book field;
    (2) a contacts field; and
    (3) a group field.

40. An integrated address book clearinghouse interface as claimed in claim 1 wherein the address book set a parental control allow list in an address book response field comprising a hyperlink to a Web service.

* * * * *